Patented Jan. 6, 1942

2,269,145

UNITED STATES PATENT OFFICE 2,269,145

STABILIZED ERGOT ALKALOID PREPARATION

Samuel H. Culter and Robert E. Himelick, Kalamazoo, Mich., assignors to The Upjohn Company, Kalamazoo, Mich.

No Drawing. Application June 16, 1939, Serial No. 279,390

6 Claims. (Cl. 167—67)

This invention relates to improvements in stabilized ergot alkaloid preparations.

This invention relates to the stabilization of ergot alkaloids against deterioration with respect to their therapeutic properties.

It has long been recognized that solutions of ergot alkaloids such as fluidextract of ergot U. S. P. XI decompose rather rapidly over a period of a few months and that they lose their therapeutic activity. This deterioration has been ascribed to oxidation, but it has been found that recognized antioxidants are not entirely satisfactory as stabilizing agents, and that in some instances the addition of recognized antioxidants such as sulfites does not stabilize the solution but rather tends to hasten the deterioration.

We have found that the isomers of ascorbic acid, which is also known as cevitamic acid and particularly l-ascorbic acid and d-iso-ascorbic acid are effective stabilizing agents for stabilizing solutions of ergot alkaloids against deterioration with respect to their therapeutic properties.

We have found that the addition of 0.5% weight to volume of l-ascorbic acid to fluidextract of ergot U. S. P. XI, which is a solution of ergot alkaloids containing 40% ethyl alcohol by volume and 2% hydrochloric acid by volume, stabilizes the solution to such an extent that after four months storage at room temperature the loss of therapeutic potency is only 4%. In a control sample of the fluidextract of ergot U. S. P. XI, the loss of therapeutic potency was more than 20%.

We have found that an acid aqueous solution of the partially purified total alkaloids of ergot containing 10% alcohol by volume and sufficient tartaric or maleic acid to produce pH 3 deteriorates rapidly. In one month storage at room temperature, 30% of the therapeutic activity is lost. In two months 60% is lost. After two months' time the deterioration continues but at a much slower rate. The solution is considerably darker than at the time of preparation and contains a dark colored precipitate.

When the isomers of ascorbic acid are added to such solution, the deterioration is materially less at room temperature and when the material is stored in refrigerators there is no loss in potency which can be detected. When 0.1% by volume of either l-ascorbic acid or d-iso-ascorbic acid was added to the above mentioned 10% alcohol solution of the alkaloids of ergot, we found that at the end of two months the product had deteriorated 94% with respect to its therapeutic activity, whereas the control sample had deteriorated 60%. At the end of six months' time, the solution had deteriorated only 9.5% with respect to therapeutic activity.

When 0.3% weight to volume of either l-ascorbic acid or d-iso-ascorbic acid was added to this same solution, at the end of two months the product had deteriorated only 5.6% with respect to its therapeutic activity.

When 0.5% weight to volume of either l-ascorbic acid or d-iso-ascorbic acid was added to this same solution, therapeutic activity decreased 7.5% in two months' time and 7.9% in three months' time.

These results which were obtained at room temperature show a material stabilization and an improvement over the control samples which had not had the addition of ascorbic acid.

When the same 10% alcohol solution was kept in a household refrigerator at about 40 degrees Fahrenheit, for three months, the product lost 15 to 20% of its therapeutic activity. When the same product which had received either 0.1, 0.3 or 0.5% weight to volume of either l-ascorbic acid or d-iso-ascorbic acid was similarly stored at the same temperature, the deterioration with respect to therapeutic properties could not be measured.

In every instance the samples were sealed in glass ampuls and were protected from light.

We have found that the isomer of ascorbic acid may be added as free acid or may be added as salts of the isomers of ascorbic acid. When the salts are added, if the solution of ergot alkaloids is not sufficiently acid, there will be a precipitation of the ergot alkaloids and it is necessary to correct this condition by adding acid to convert the salts into the isomers of the acid.

We have found that sodium, calcium or ammonium salts may be employed as are the acids, but we found it necessary to employ an organic acid to convert the salts into free acid. The solution of ergot alkaloids must have a pH of approximately 3 in order to retain the ergot alkaloids in solution and the organic acid must be added if the addition of the salt raises the pH above this point.

We have added .3% weight to volume of sodium, calcium and ammonium salts of d-iso-ascorbic acid and have obtained results substantially the same as those obtained using the free acid. When the salts are used, it may be necessary to add an organic acid such as maleic acid to give the desired pH for retaining the ergot alkaloids in solution. When .3% weight to volume of the salts were added, we found it desirable to add .2% weight to volume of maleic acid. The samples kept at room temperature for two months were of substantially the same potency as the samples in which the free acid was employed.

It will be apparent that in following our invention, the addition of the ascorbic acid has a very material stabilizing action and that particularly at lower temperatures the deterioration with respect to therapeutic properties is practically eliminated. It is our desire to cover our invention both broadly and narrowly within the scope of the appended claims.

Having thus described our invention, what we claim as new and desire to secure by Letters Patent is:

1. A solution containing ergot alkaloid and from 0.1 to 0.5 percent of ascorbic acid and having great stability against deterioration with respect to its therapeutic properties.

2. A solution containing ergot alkaloid and ascorbic acid and having great stability against deterioration with respect to its therapeutic properties.

3. A solution containing ergot alkaloid and from 0.1 to 0.5 percent of l-ascorbic acid and having great stability against deterioration with respect to its therapeutic properties.

4. A solution containing ergot alkaloid and l-ascorbic acid and having great stability against deterioration with respect to its therapeutic properties.

5. A solution containing ergot alkaloid and from 0.1 to 0.5 percent of d-iso-ascorbic acid and having great stability against deterioration with respect to its therapeutic properties.

6. A solution containing ergot alkaloid and d-iso-ascorbic acid and having great stability against deterioration with respect to its therapeutic properties.

SAMUEL H. CULTER.
ROBERT E. HIMELICK.